United States Patent [19]

Tucker

[11] Patent Number: 4,546,433

[45] Date of Patent: Oct. 8, 1985

[54] ARRANGEMENT FOR PROCESSING DATA IN A TWO-DIMENSIONAL ARRAY

[75] Inventor: Christopher J. Tucker, Pitsea, England

[73] Assignee: GEC Avionics Limited, Rochester, England

[21] Appl. No.: 393,435

[22] Filed: Jun. 29, 1982

[30] Foreign Application Priority Data

Jul. 4, 1981 [GB] United Kingdom ............... 8120731

[51] Int. Cl.⁴ ............................................. G06F 15/16
[52] U.S. Cl. .................................................. 364/200
[58] Field of Search ... 364/200 MS File, 900 MS File; 382/55, 49

[56] References Cited

U.S. PATENT DOCUMENTS

| | | | |
|---|---|---|---|
| 3,106,698 | 10/1963 | Unger | 382/49 |
| 3,308,436 | 3/1967 | Borck et al. | 364/200 |
| 3,339,179 | 8/1967 | Shelton | 382/55 |
| 4,141,066 | 2/1979 | Keiles | 364/200 |
| 4,380,046 | 4/1983 | Frosch et al. | 364/200 |
| 4,403,287 | 9/1983 | Blahut | 364/200 |

Primary Examiner—Raulfe B. Zache
Assistant Examiner—David Y. Eng
Attorney, Agent or Firm—Spencer & Frank

[57] ABSTRACT

A data processing arrangement is designed to handle two dimensional data arrays. An operation is performed on each element in the data array which is partially dependent on the nature of the neighboring data elements which surround it. In this way particular characteristics of the two dimensional array can be detected or removed, i.e. picture edges can be detected or noise can be removed. Each element and its neighboring elements are used to address a store which holds the result of performing the corresponding operation. In practice, the two dimensional array of data arrives as a continuous data bit stream so that a window corresponding to a particular element and its neighboring elements is scanned systematically across the two dimensional array. The arrangement is capable of handling a continuously arriving data stream. The operations performed on the data can be readily changed by altering the nature of the stored results. A data element which consists of a digital word having a number of bits is handled by causing each bit of data significance in the digital word to access a store to determine its corresponding result, after which the various results for the data bits in the digital word are combined to produce the final required value.

11 Claims, 4 Drawing Figures

|   | X | Y |
|---|---|---|
| EDGE DETECTORS | | |
| a | $\begin{bmatrix} -1 & 0 & 1 \\ -1 & 0 & 1 \\ -1 & 0 & 1 \end{bmatrix}$ | $\begin{bmatrix} -1 & -1 & -1 \\ 0 & 0 & 0 \\ 1 & 1 & 1 \end{bmatrix}$ |
| b | $\begin{bmatrix} -1 & 0 & 1 \\ -2 & 0 & 2 \\ -1 & 0 & 1 \end{bmatrix}$ | $\begin{bmatrix} -1 & -2 & -1 \\ 0 & 0 & 0 \\ 1 & 2 & 1 \end{bmatrix}$ |
| LOW PASS FILTERS | | |
| c | $\begin{bmatrix} 1 & 1 & 1 \\ 1 & 1 & 1 \\ 1 & 1 & 1 \end{bmatrix}$ | $\begin{bmatrix} 0 & 0 & 0 \\ 0 & 0 & 0 \\ 0 & 0 & 0 \end{bmatrix}$ |
| d | $\begin{bmatrix} 1 & 2 & 1 \\ 2 & 4 & 2 \\ 1 & 2 & 1 \end{bmatrix}$ | $\begin{bmatrix} 0 & 0 & 0 \\ 0 & 0 & 0 \\ 0 & 0 & 0 \end{bmatrix}$ |
| HIGH PASS FILTERS | | |
| e | $\begin{bmatrix} 0 & -1 & 0 \\ -1 & 5 & -1 \\ 0 & -1 & 0 \end{bmatrix}$ | $\begin{bmatrix} 0 & 0 & 0 \\ 0 & 0 & 0 \\ 0 & 0 & 0 \end{bmatrix}$ |
| f | $\begin{bmatrix} -1 & -1 & -1 \\ -1 & 9 & -1 \\ -1 & -1 & -1 \end{bmatrix}$ | $\begin{bmatrix} 0 & 0 & 0 \\ 0 & 0 & 0 \\ 0 & 0 & 0 \end{bmatrix}$ |

*FIG. 3.*

ARRANGEMENT FOR PROCESSING DATA IN A TWO-DIMENSIONAL ARRAY

BACKGROUND OF THE INVENTION

This invention relates to a data processing arrangement which is suitable for processing data representative of a two dimensional data array. The two dimensional array may be wholly synthetic in origin in that the data is deliberately organised into such an array to facilitate the further processing of it, or it may be derived from an imaging device such as a television camera which views a scene to produce an output which is inherently representative of the two dimensional scene, or further it may represent simply a two dimensional picture or photograph, or a display of the kind presented on a television monitor. The raw data may require further processing in order to extract from it information having a particular characteristic, or to modify the data in a special way, or in order to remove spurious matter which impairs the quality of the original information. For example, in the case of a television picture, it may be desired to filter out noise of a particular bandwidth. Alternatively, it may be necessary to process the data which is representative of a viewed scene so as to emphasise selected qualities or properties which are difficult to discern.

From the foregoing, it will be apparent that for a number of reasons, the processing of data derived from a two dimensional pattern is required. However, a processing operation of this nature presents special difficulties not only because of the very large amount of data which comprises a typical two dimensional array such as a television picture, but because the processing of each data element of the array depends not only on that element itself, but on the nature of surrounding or neighbouring or otherwise related elements. Although, in principle, powerful general purpose data processing arrangements can be organised or programmed to achieve the desired result, the processing power is necessarily large and the processing time needed to achieve the result can be unacceptably long. The time taken to process the information can be of great importance in certain circumstances. For example, the data to be processed may be generated during successive television frame periods and is therefore continually arriving for processing, i.e. the processing takes place in real time so as to keep pace with the rate at which new data is being generated. This requirement cannot be met in a practical manner by a general purpose processor, and although dedicated hard wired systems can perform a specific operation quickly, they have other disadvantages. For example, a dedicated processor is not versatile and cannot therefore be used readily to perform a modified operation which differs from that which it was designed to handle.

The present invention seeks to provide an improved data processing arrangement.

SUMMARY OF THE INVENTION

According to this invention, a data processing arrangement includes means for receiving data in the form of a serial stream in which data elements are representative of a two dimensional data array and each data element comprises a plurality of data bits; means for passing the serial stream sequentially in time to a plurality of data access points so that at certain times a particular data bit of a particular data element and data bits of the same corresponding significance of other data elements relating to predetermined positions relative to said particular data element in said two dimensional data array occupy respective access points; means utilising the data bits temporarily present at said access points to address means which are responsive thereto to make available the result of performing on said particular data bit an operation which is at least in part a function of the nature of said bits of said other data elements; and wherein the plurality of results which are obtained, and which correspond to the number of data bits representing a data element, are combined to determine the effect of performing the operation on a data element as a whole.

The present invention is particularly suitable for processing data arranged in the form of a television-like raster pattern and from which information relating to prominent edges, abrupt discontinuities, and other visual outstanding features are to be extracted so that the remaining extraneous noise and less significant visual features represented by gradual or minor variations in intensity can be discarded. Such a process is sometimes termed edge detection and the basis of the operation comprises comparing each data element with neighbouring elements to decide whether that element itself is likely to form part of an edge—in this context an edge is merely a region in which large variations in intensity occur over a very short distance.

A specific example of the present invention is described with particular reference to an edge detector in which edges are detected within an array of generalised multi-level "pixels". "Pixel" is the term given to each data element representing a picture point in the two dimensional array, and an edge enhanced picture is built up by performing operations on each region of $3 \times 3$ pixels, i.e. a region notionally consisting of the particular pixel under consideration and its eight closest neighbouring pixels.

The principle underlying the detection of edges is as follows.

Let an $n \times n$ array be:

$$F(i,j) \quad i=1,2,3\ldots n \quad j=1,2\ldots n \tag{1}$$

i = Rows, j = Columns

Then at each non-boundary image point (i.e. for every F(i,j) with $i \neq 1,n$ and/or $j \neq 1,n$) the following two parameters have to be computed:

$$X(i,j) = aF(i-1,j-1) + bF(i,j-1) + cF(i+1,j-1) + dF(i-1,j+1) + eF(i,j+1) + fF(i+1,j+1) \tag{2}$$

and $$Y(i,j) = gF(i-1,j-1) + hF(i-1,j) + kF(i-1,j+1) + lF(i+1,j-1) + mF(i+1,j) + pF(i+1,j+1) \tag{3}$$

where a,b,c,d,e,f,g,h,k,l,m and p are constants for a particular algorithm. This can be more conveniently visualised as two weighting masks simultaneously applied to each image point (pixel) in turn.

$$\text{i.e. } X = \begin{bmatrix} a & o & d \\ b & o & e \\ c & o & f \end{bmatrix} \quad Y = \begin{bmatrix} g & h & k \\ o & o & o \\ l & m & p \end{bmatrix} \tag{4}$$

A particular edge detection algorithm involves the following two masks:

$$X = \begin{bmatrix} -1 & 0 & 1 \\ -2 & 0 & 2 \\ -1 & 0 & 1 \end{bmatrix} \quad Y = \begin{bmatrix} -1 & -2 & -1 \\ 0 & 0 & 0 \\ 1 & 2 & 1 \end{bmatrix} \quad (5)$$

This algorithm is called, for ease of subsequent reference, the Sobel.

To achieve an edge gradient picture it is necessary to combine each X (i,j), Y (i,j) pair to form a new picture array:

$$W(i,j) \quad i,j \neq o, n \quad (6)$$

Two possible methods of combination are:

$$(1) \ W(i,j) = \sqrt{X^2(i,j) + Y^2(i,j)} \quad (7)$$

or $$(2) \ W(i,j) = |X(i,j)| + |Y(i,j)| \quad (8)$$

Although the first method is likely to result in superior performance, it is more practicable to adopt the second method because of its greater computational simplicity. A new two dimensional array is therefore produced in which edges are greatly enhanced relative to the level of background or nonenhanced elements.

The operation required to make the algorithm an edge detector is thresholding. The edge gradient picture array, W (i,j) is thresholded to produce a new, output array:

$$Z(i,j) \quad i,j \neq o, n \quad (9)$$

The value of each picture point in W is compared with a number (i.e. the threshold). If a particular W(p,q) is greater than the threshold then $$Z(p,q) = 1$$

i.e. an edge is deemed to be present.
If a particular W (p,q) is less than the threshold then $$Z(p,q) = 0$$

i.e. an edge is deemed to be absent.

It is apparent that Z (i,j) is a binary edge picture consisting only of points of magnitude 1 or 0.

To summarise the above procedures, 3×3 edge detection involves three stages:

(1) The application of two weighting masks to each nonboundary picture point.
(2) A suitable combination of the results from these masks to produce a multi-level, edge gradient picture.
(3) Thresholding to produce a binary output picture.

The exact weighting masks, combination routine and threshold determine the performance of the detector for a given class of input pictures.

BRIEF DESCRIPTION OF THE DRAWING

The invention is further described by way of example with reference to the accompanying drawings, in which FIG. 3 is a table showing different processing masks (i.e. weighting factors)

DESCRIPTION OF THE PREFERRED EMBODIMENTS

Figure 1:
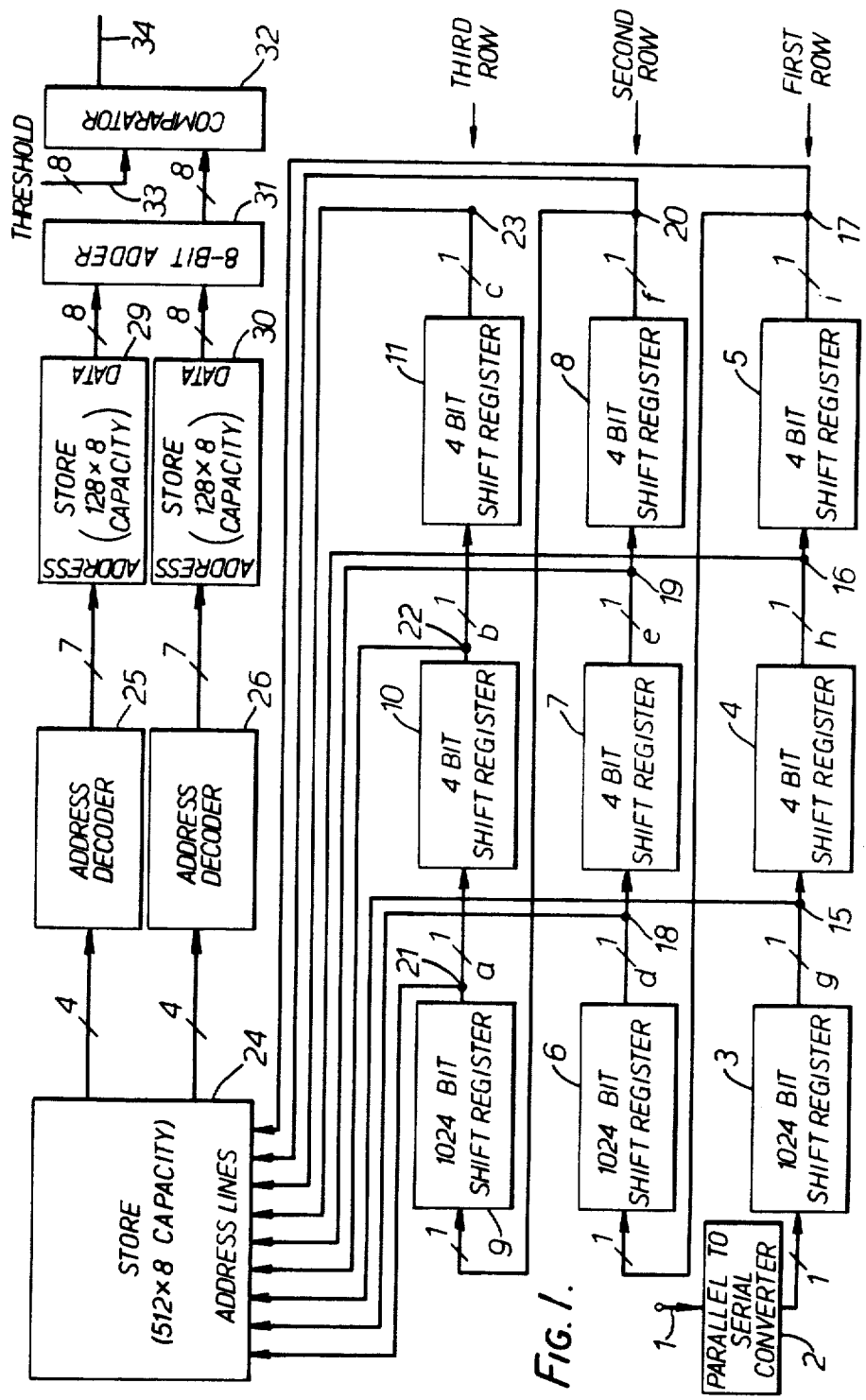
FIG. 1 shows a data processing arrangement in accordance with this invention.

Data representative of a two dimensional data array is derived, for example, from a television camera in the form of a raster pattern. The television output is digitised and buffered before entering via terminal 1 into the parallel to serial converter 2. It is assumed that each television line consists of 258 pixels, as previously defined, of which 256 represent genuine data and the first and last pixels are arbitrarily assigned to the data stream to enable the first and last pixels of the original 256 pixels to be correctly processed. Each pixel is digitally coded into a four bit word, so that each television line consists of 1032 digital bits. The digital stream provided at the output of the parallel to serial converter 2 represents the original picture information, and it is fed serially through nine serial shift registers 3, 4, 5, 6, 7, 8, 9, 10 and 11. Shift registers 3, 6 and 9 each have a capacity of 1024 digital bits, whereas the remaining shift registers each have a capacity of only four digital bits. It will be apparent that the shift registers are arranged in three rows, each row of which is capable of holding an entire line of 258 pixels. Each pixel consists of a word of four digital bits, as previously mentioned, arranged in ascending order of significance, i.e. for each pixel its least significant bit (LSB) appears first, which is followed by the next least significant bit (NLSB), which is followed by the next next least significant bit (NNLSB) and finally the most significant bit (MSB) appears. When the first line of data has been clocked into the first row of shift registers, it will be apparent that the very first pixel is held in shift register 5, the second pixel is held in shift register 4 and the third pixel is held in the four storage bits of shift register 3 nearest to its output point. Furthermore, it will be apparent that the three bits which are accessible at the output points of the three shift registers 3, 4 and 5 correspond to the least significant bits of these three pixels. When the second line of data is received from the parallel to serial converter 2, the first line of data is pushed serially through shift registers 6, 7 and 8, and subsequently the third line pushes the preceding two lines of data through the shift registers, so that when the third line of data is present in the first row of the shift registers, the second line is held in the second row and the first line is held in the third row.

This action is, of course, achieved automatically as the serial shift registers are clocked by means of a clock source (not shown) running at an appropriately high frequency. When the third line of data has been entered into the shift registers, the remainder of the arrangement shown in FIG. 1 is enabled, and accesses the output point of each of the nine shift registers. It will be apparent that when the first three lines of the picture are stored in the nine shift registers, the bits which are being sampled at the access points 15, 16, 17, 18, 19, 20, 21, 22 and 23 are the least significant bits of a 3×3 window surrounding pixel F (2,2), using the notation of equation (1) given previously. F (2,2) represents the centre of the window, and these nine bits form the address field of a store 24. In practice, store 24 has a capacity equivalent to 512 digital words of which each digital word has a length of eight bits. Conveniently, the store is constituted as a programmable memory. Stored at the location specified by the address field defined by the nine least significant bits of the window is two processed versions of them. In general terms, the data stored at the specified location corresponds to the values produced by applying the two weighting masks, defined by equation (4), to the centre pixel of the 3×3 window. Details of this process are described subsequently.

Successive picture lines are continually input to terminal 1, and when the least significant bit of the first pixel of the fourth line of the picture is applied to the shift register 3, the whole of the contents of the nine shift registers 3 to 11 is necessarily and automatically clocked forward by one bit position. The bits that are then being sampled at the nine access points are the next least significant (NLSB) bits of a 3×3 window surrounding the same pixel, F (2,2) as previously. These nine NLSB bits form a new address field of store 24 at which store location two processed versions of these bits are held. When all of the four bits of the first pixel of line 4 have been input to the shift register 3, then the bits which are currently being sampled at the access points 15 to 23 are the least significant bits of a window surrounding pixel F (2,3). Thus as the clocking process continues the whole line 4 is loaded into the shift registers, and the 3×3 window is automatically shifted so as to scan across the entire picture a bit plane at a time and is used to form the complete address field of the store 24. The processing achieved by the store 24 is as follows.

As previously stated the address field is one complete bit-plane of a 3×3 window surrounding a pixel F (i,j). The location specified by this address field contains two results comprising two data fields of 4 bits each. The numerical values of these fields are a result of applying weighting masks to the 3×3 bit-plane. This process is illustrated by the following example.

Example: The Sobel is to be applied to the 3×3 pixel region given below:

$$\begin{matrix} 5 & 3 & 5 \\ 11 & 14 & 13 \\ 11 & 10 & 12 \end{matrix} \quad (10)$$

The following is a digital representation of this region:

$$\begin{matrix} 010\underline{1} & 001\underline{1} & 010\underline{1} \\ 101\underline{1} & 111\underline{0} & 110\underline{1} \\ 101\underline{1} & 101\underline{0} & 110\underline{0} \end{matrix} \quad (11)$$

The LSB-plane is:

$$\begin{matrix} 1 & 1 & 1 \\ 1 & 0 & 1 \\ 1 & 0 & 0 \end{matrix} \quad (12)$$

These were the bits underlined in equation (11). When the Sobel X mask (see equation (5)) is applied to this bit plane the result is $1 \times (-1) + 1 \times (-2) + 1 \times (-1) + 1 \times 1 + 1 \times 2 \times 0 \times 1 = -1$. When the Sobel Y mask (equation (5)) is applied the result is:

$$1 \times (-1) + 1 \times (-2) + 1 \times (-1) \\ + 1 \times 1 + 0 \times 2 + 0 \times 1 = -3$$

Hence, $-3$ would be represented in one of the data fields of store 24 and $-1$ would be stored in the other. The next significant bit plane, i.e.

$$\begin{matrix} 0 & 1 & 0 \\ 1 & 1 & 0 \\ 1 & 1 & 0 \end{matrix} \quad (13)$$

addresses a new location in store 24 where the following values are stored.

$$X = 0x(-1) + 1 \times (-2) + 1 \times (-1) + 0 \times 1 + 0 \times 2 + 0 \times 1 = -3$$

$$Y = 0x(-1) + 1 \times (-2) + 0 \times (-1) + 1 \times 1 + 1 \times 2 + 0 \times 1 = 1$$

A summary of the Sobel applied to all four bit-planes can be represented as:

|  | X | Y | (14) |
|---|---|---|---|
| LSB | $-1$ | $-3$ | |
| NLSB | $-3$ | 1 | |
| NNLSB | 3 | $-1$ | |
| MSB | 0 | 4 | |

However, the four digital bits which represent the first pixel correspond to a single picture point, and it is necessary to produce a single value of X and a single value of Y which represents the modified pixel. The processing necessary to achieve these combined values of X and Y are performed in the address decoders 25 and 26 respectively. These address decoders are illustrated in greater detail in FIG. 2.

Figure 2:
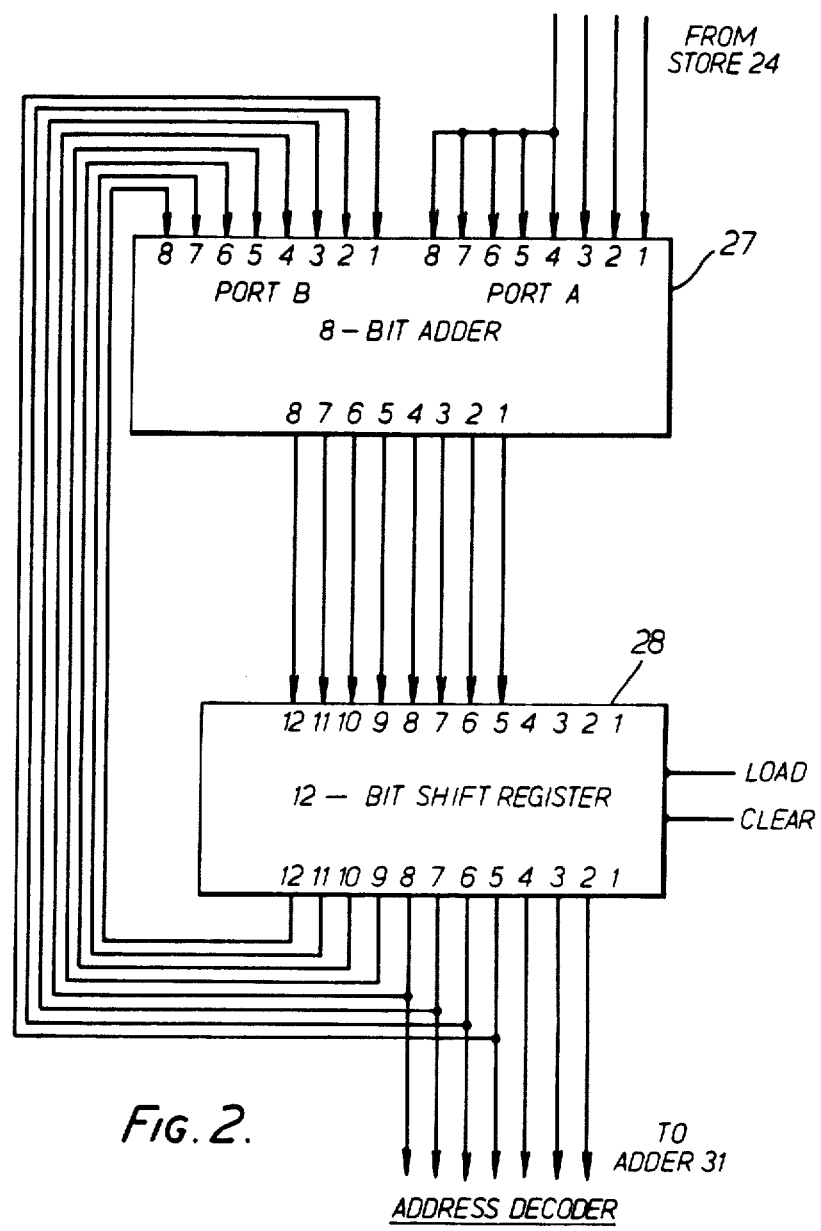
FIG. 2 shows part of the arrangement in greater detail.

Referring to FIG. 2, each address decoder consists of an eight bit adder 27 and a twelve bit shift register 28. It will be seen that the adder 27 receives a four bit parallel input from store 24 and provides a seven bit parallel output to access a store 29 or 30 (see FIG. 1). It will be apparent from equation (14) that X and Y may be positive or negative. It is generally preferred in processing systems to adopt a number system which avoids the need to incorporate binary subtractors and in the present arrangement the data is held in store 24 in the form of a 2's complement number system. Accordingly, the address decoders 25 and 26 operate in this number system. The function of the address decoders is to take the four X values and the four Y values given in equation (14) and to combine them in the appropriate fashion to produce a combined X value, and a combined Y value. Thus the two sets of four values resulting from the application of the masks to the four bit-planes surrounding a pixel are weighted and combined. The weighting and combination is as follows:

$$X = 8X_{MSB} + 4X_{NNLSB} + 2X_{NLSB} + X_{LSB} \quad (15)$$

$$Y = 8Y_{MSB} + 4Y_{NNLSB} + 2Y_{NLSB} + Y_{LSB}$$

where $X_{MSB}$ is the result of applying an X mask to the most significant bit-plane etc.

Clearly, every four inputs to each of these units results in one output. Returning to the example:

$$X = 8 \times 0 + 4 \times 3 + 2 \times (-3) + (-1) = 5 \quad (16)$$

$$Y = 8 \times 4 + 4 \times (-1) + 2 \times 1 + (-3) = 27$$

This is the result of weighting and combining the values given in equation (14) according to the rules specified in equation (15).

Now, applying the Sobel masks to the 3×3 pixel region specified in equation (10) directly results in:

$$X \times 5 \times (-1) + 11 \times (-2) + 11 \times (-1) + 5 \times 1 + 13 \times 2 + 12 \times 1 = 5$$

$$Y = 5 \times (-1) + 3 \times (-2) + 5 \times (-1) + 11 \times 1 + 10 \times 2 + 12 \times 1 = 27$$

This is in complete agreement with equation (16), and confirms that each pixel can be processed as four bitplanes.

The combination and weighting can be achieved very simply with the address decoders shown in FIG. 2. Its use can be illustrated computing the X output of the example, (see equation (16)).

The first input to this unit is $X_{LSB}$, i.e.

1 1 1 1

Port B, of the 8-bit adder, is zero hence a sign extended $X_{LSB}$ is written into the 12-bit shift register.

i.e. 1 1 1 1 1 1 1 1 . 0 0 0 0

The shift register is then shifted one position to the right to give 0 1 1 1 1 1 1 1 . 1 0 0 0

The bits that are underlined are input to port B of the adder. Port A now has a sign-extended $X_{NLSB}$ as an input. These two values are added.

```
i.e.   0 1 1 1 1 1 1 1   Port B
     + 1 1 1 1 1 1 0 1   Port A
       0 1 1 1 1 1 0 0
```

This result is written into the shift register locations to the left of the binary point. That is, the contents of the shift register is now 0 1 1 1 1 1 0 0 . 1 0 0 0

The register is then shifted one position to the right to give 0 0 1 1 1 1 1 0 . 0 1 0 0

The bits that are underlined are input to port B of the adder. Port A has a sign-extended $X_{NNLSB}$ as an input. These two values are added

```
  0 0 1 1 1 1 1 0   Port B
+ 0 0 0 0 0 0 1 1   Port A
  0 1 0 0 0 0 0 1
```

This result is written to the shift register in the same manner as before to yield 0 1 0 0 0 0 0 1 . 0 1 0 0

The register is shifted one position to the right and the integer part, i.e.

0 0 1 0 0 0 0 0 is input to port B of the adder. This is added to a sign-extended $X_{MSB}$ to yield

```
  0 0 1 0 0 0 0 0   Port B
+ 0 0 0 0 0 0 0 0   Port A
  0 0 1 0 0 0 0 0
```

This result is written to the shift register to yield $$0 0 1 0 0 0 0 0 . 1 0 1 0 \quad (17)$$

To summarise, this is the result of the following operations $$X_{MSB} + \frac{\left[\frac{\left[\frac{X_{LSB}}{2} + X_{NLSB}\right]}{2} + X_{NNLSB}\right]}{2} \quad (18)$$

Multiplication of equation (18) by 8 yields $$8X_{MSB} + 4X_{NNLSB} - 2X_{NLSB} + X_{LSB}$$

This is equal to the required weighting and combination as defined by equation (15). Hence, result (17) must be multiplied by 8 to achieve the correct result i.e. 0 0 1 0 0 0 0 0 1 0 1

Only the lower 7 bits of this result have any significance 0 0 0 0 1 0 1 = Decimal 5 which is the same result as previously obtained.

Thus the address decoders correctly calculate the required resultant values of X and Y. As was indicated in equations (7) and (8), it is then necessary to calculate $X^2$ or $|X|$. This operation is performed by store 29 for X and by store 30 for Y. Although the calculation is in principle a trivially simple one, it will be recalled that the output of the address decoders is in a 2's complement number system. It is therefore convenient to use the stores 29 and 30 to convert not only from this number system to the normal number system, but to perform the operations defined by equations (7) or (8) at the same time. Thus the address decoder 25 produces a value of X or Y in the 2's complement number system which is used as the address field for a location in the store 29 or 30. Held at that location is the required value of $X^2$ or $|X|$, as the case may be, and the outputs from the stores 29 and 30 are summed in an adder 31 to calculate W (i,j). This result is passed to a comparator 32 to determine whether or not this value is greater than a threshold value. If the value is greater than a threshold level received on line 33, the output of the comparator 32 provides a logic 1 bit at output terminal 34, whereas if the value W (i,j) is less than the threshold, a 0 bit is provided at terminal 34.

This process is continued for each pixel so that as each new line of picture enters the shift registers, the previous lines are pushed forward to that the 3×3 window is shifted across the picture a bit plane at a time until the entire data array has been scanned. The nine bits defined by the window in any position are used to address the store 24 and the data field of the store location specified by that address is divided into two four bit fields. Thus the leads between store 24 and each of the address decoders 25 and 26 are each parallel four-bit paths. In each of the data fields stored within the store 24 is the result of the application of a weighting mask to the addressing bit plane.

In the present example, the process operates to receive a multi-level two dimensional data array representing a picture and produces as an output the two level picture, i.e. one consisting only of a pattern of 1's or 0's, in which a one level represents the existence of an edge in the original data array.

The structure described in FIG. 1 is of an extremely versatile nature. Thus the threshold value 33 can be varied dynamically during the actual course of processing the picture, and furthermore the nature of the combination specified by equations (7) and (8) can be rapidly interchanged by altering the results held in stores 29 and 30. It will be appreciated that the system can handle a large array of data very rapidly indeed so that, for example, as television picture information is generated at a television camera it can be processed in real time to produce an output picture which is an edge enhanced version of the original data.

The specific weighting masks given in equations (4) and (5) are such as to give rise to the edge enhanced picture, but the use of other different 3×3 mask provides different functions. For example, a single mask

```
1 1 1
1 2 1
1 1 1
``` is a two dimensional low pass filter with noise cleaning properties. This mask can be directly implemented with the arrangement illustrated in FIG. 1—it is merely necessary to enter the corresponding results into store 24 as an initial procedure. Thus the structure described is extremely versatile. Many other functions can, of course, be provided by means of the structure described in addition to the edge enhancement function which has been specifically described.

The degree of success in producing an edge enhanced picture using the masks described depends partly on the characteristics of the picture being processed; some pictures respond more satisfactorily to different masks. Two possible X and Y masks which can be used to provide edge enhancement are set out as a and b in FIG. 3. Suitable masks can be used for other purposes: low pass filter masks are set out at c and d, and high pass filter masks are set out at e and f of FIG. 3. From this it will be appreciated that a large number of different operations can be achieved using the same hardware very quickly and inexpensively, simply by entering the appropriate new data into the store 24.

Figure 4:
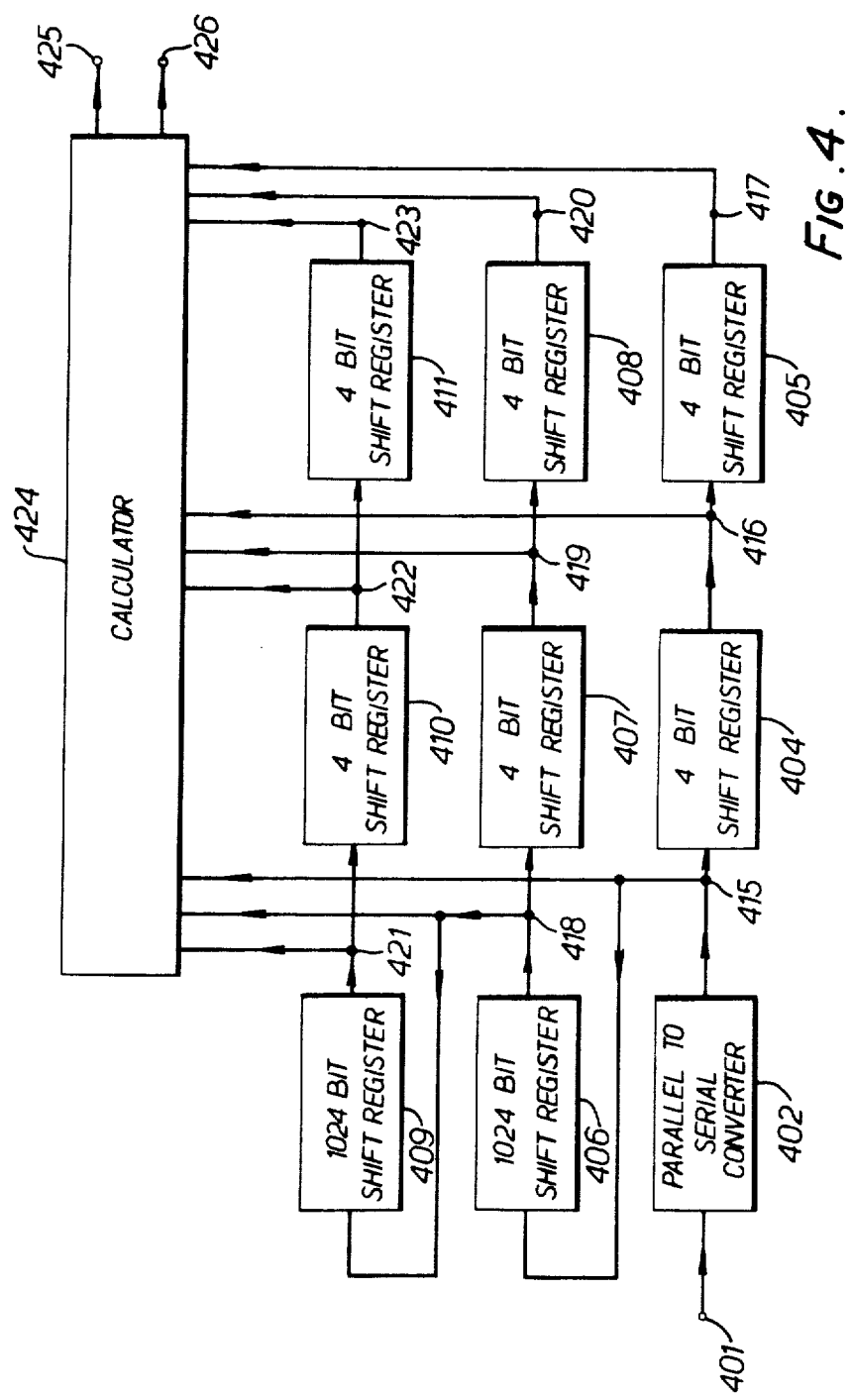
FIG. 4 shows part of a modified data processing arrangement.

FIG. 4 shows an alternative arrangement of FIG. 1, in which the layout of the shift registers is modified, so as to simplify their control, and to dispense with one of the 1024 bit shift registers. The incoming data is received at terminal 401, and converted to serial form at the parallel to serial converter 402. It is then fed sequentially in time to nine access points 415 to 423 inclusive, with the two 1024 bit shift registers 406 and 409, and the six 4 bit shift registers 404, 405, 407, 408, 410 and 411 being arranged to ensure that the correct combination of data bits are temporarily present at the access points at a particular instant in time. As compared with FIG. 1, only two 1024 bit shift registers are required, and the control of the network of shift registers is somewhat simplified.

The data present at the access points is routed to a calculator 424, which is arranged to perform the two particular calculations defined by the Sobel X and Y masks of equation (5). As the access points present data elements as four sequential bit planes to the calculator, the individual calculations are of a very simple and straightforward nature (as exemplified by the calculations following equations (12) and (13)). Consequently these calculations can be performed by standard and conventional logic gates very rapidly, and the two X and Y values are made available at terminals 425 and 426 for presentation to the address decoders 25 and 26 of FIG. 1.

I claim:

1. A data processing arrangement including means for receiving data in the form of a serial stream in which data elements are representative of a two dimensional data array and each data element comprises a plurality of data bits; means for passing the serial stream sequentially in time to a plurality of data access points so that at certain times a particular data bit of a particular data element and data bits of the same corresponding significance of other data elements relating to predetermined positions relative to said particular data element in said two dimensional data array occupy respective access points; means connected to receive the data bits temporarily present at said access points for performing on said particular data bit a selected operation which is at least in part a function of the nature of said bits of said other data elements, to produce a result of the selected operation; and means connected to receive the results produced by performing the selected operation on all of the data bits representing a data element for producing an indication of the result of performing the selected operation on said particular data element as a whole.

2. An arrangement as claimed in claim 1 and wherein the data temporarily present at said access points are used to address said means for performing, and said means for performing comprise a plurality of means which are responsive to such data to make available the results of performing a corresponding plurality of operations.

3. An arrangement as claimed in claim 1 or 2 and wherein said means for performing comprises one or more store locations at which are stored said result(s).

4. An arrangement as claimed in claim 1 or 2 and wherein said means for performing comprises means adapted to calculate, in response thereto, said result(s).

5. An arrangement as claimed in claim 1 and wherein the plurality of data bits representing each data element is present in said serial stream in ascending order of significance.

6. An arrangement as claimed in claim 1 and wherein said other data elements correspond to the eight neighbouring data elements which most closely surround said particular data element in said two dimensional array.

7. An arrangement as claimed in claim 1 and wherein the serial stream is continuously clocked to said access points, so that the access points constitute a window which is caused to scan across the entire two dimensional data array.

8. An arrangement as claimed in claim 7 and wherein the means for passing the serial bit sequentially to a plurality of data access points comprises a number of serially connected shift registers having output ports which constitute said access points.

9. An arrangement as claimed in claim 7 and wherein said operations are arranged to quantify an edge present at said particular data element in said two dimensional data array, and wherein said means for performing comprise a plurality of memory location means each containing results of performing an edge gradient operation in two mutually perpendicular directions with respect to the two dimensional data array, and wherein the data bits present at said access points are applied to said means for performing in order to address respective memory location means.

10. An arrangement as defined in claim 9 wherein said means for producing an indication comprise means for combining the results produced by performing the selected operation on all of the data bits representing said particular data element to produce said indication for said particular data element, and threshold means connected for comparing each indication with a threshold value which represents the presence of a detected edge having a particular magnitude and said particular data element.

11. An arrangement as claimed in claim 10 and wherein the said indications which exceed said threshold value are utilised to organise a further two dimensional array of data elements representing detected edges.

* * * * *